US010817789B2

(12) United States Patent
Fischer (10) Patent No.: US 10,817,789 B2
(45) Date of Patent: Oct. 27, 2020

(54) DETERMINATION OF OPTIMAL ENERGY STORAGE METHODS AT ELECTRIC CUSTOMER SERVICE POINTS

(71) Applicant: Opower, Inc., Arlington, VA (US)

(72) Inventor: Barry Fischer, San Francisco, CA (US)

(73) Assignee: OPower, Inc., Redwood Shores, CA (US)

( * ) Notice: Subject to any disclaimer, the term of this patent is extended or adjusted under 35 U.S.C. 154(b) by 1070 days.

(21) Appl. No.: 14/734,919

(22) Filed: Jun. 9, 2015

(65) Prior Publication Data

US 2016/0364646 A1    Dec. 15, 2016

(51) Int. Cl.
G06F 17/00    (2019.01)
G06N 5/02    (2006.01)
G06N 5/04    (2006.01)
H02J 3/38    (2006.01)
H02J 3/32    (2006.01)
(Continued)

(52) U.S. Cl.
CPC ............... *G06N 5/04* (2013.01); *B60L 53/30* (2019.02); *B60L 53/50* (2019.02); *B60L 53/51* (2019.02); *B60L 53/52* (2019.02); *B60L 53/64* (2019.02); *B60L 53/665* (2019.02); *B60L 55/00* (2019.02); *G06Q 10/0631* (2013.01); *G06Q 50/06* (2013.01); *H02J 3/32* (2013.01); *H02J 3/383* (2013.01); *H02J 13/0006* (2013.01); *H02J 15/00* (2013.01); *H02J 2203/20* (2020.01); *Y02E 10/563* (2013.01); *Y02E 10/566* (2013.01); *Y02E 40/72* (2013.01); *Y02E 60/722* (2013.01);
(Continued)

(58) Field of Classification Search
CPC .. G06N 5/04; H02J 15/00; H02J 3/383; Y02E 10/563
See application file for complete search history.

(56) References Cited

U.S. PATENT DOCUMENTS 4,334,275 A    6/1982 Levine
4,843,575 A    6/1989 Crane
(Continued)

FOREIGN PATENT DOCUMENTS

AU    2010315015    7/2014
CA    2779754    5/2011
(Continued)

OTHER PUBLICATIONS

KR20130022039 English Translation, Greenvale Inc. Oct. 17, 2013.*
(Continued)

*Primary Examiner* — Luis A Sitiriche
(74) *Attorney, Agent, or Firm* — Kraguljac Law Group, LLC (57) ABSTRACT

Aspects of the subject technology relate to methods and systems for recommending an energy storage device. In some aspects, a method of the subject technology can include steps for aggregating consumption data for a customer, receiving energy production data for each of a plurality of energy production sources, and determining a utilization efficiency score for each of the plurality of energy storage devices based on the consumption data and the energy production data. In some aspects, methods of the subject technology can also include steps for ranking two or more of the energy storage devices based on the utilization efficiency. In some aspects, machine-readable media are also provided.

20 Claims, 5 Drawing Sheets

(51) Int. Cl.
  *H02J 13/00* (2006.01)
  *G06Q 10/06* (2012.01)
  *B60L 53/66* (2019.01)
  *B60L 53/50* (2019.01)
  *G06Q 50/06* (2012.01)
  *B60L 53/52* (2019.01)
  *B60L 53/51* (2019.01)
  *B60L 55/00* (2019.01)
  *B60L 53/30* (2019.01)
  *B60L 53/64* (2019.01)
  *H02J 15/00* (2006.01)

(52) U.S. Cl.
  CPC .............. Y02E 70/30 (2013.01); Y04S 10/123 (2013.01); Y04S 10/14 (2013.01)

(56) References Cited

U.S. PATENT DOCUMENTS

| | | |
|---|---|---|
| 5,513,519 A | 5/1996 | Cauger et al. |
| 5,566,084 A | 10/1996 | Cmar |
| 5,717,609 A | 2/1998 | Packa et al. |
| 5,855,011 A | 12/1998 | Tatsuoka |
| 5,873,251 A | 2/1999 | Iino |
| 5,930,773 A | 7/1999 | Crooks et al. |
| 5,930,803 A | 7/1999 | Becker et al. |
| 5,948,303 A | 9/1999 | Larson |
| 6,035,285 A | 3/2000 | Schlect et al. |
| 6,088,688 A | 7/2000 | Crooks et al. |
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0179887 A1* | 7/2008 | Kawazoe ............... F03D 7/028 290/44 |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |

(56) References Cited

U.S. PATENT DOCUMENTS

| | | |
|---|---|---|
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231028 A1* | 9/2011 | Ozog ............ G06Q 10/06 700/291 |
| 2011/0231320 A1 | 9/2011 | Irving |
| 2011/0238232 A1 | 9/2011 | Yasushi et al. |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |
| 2012/0053740 A1 | 3/2012 | Venkatakrishnan et al. |
| 2012/0066168 A1 | 3/2012 | Fadell et al. |
| 2012/0078417 A1 | 3/2012 | Connell, II et al. |
| 2012/0084063 A1 | 4/2012 | Drees et al. |
| 2012/0130556 A1* | 5/2012 | Marhoefer ............ G06Q 50/06 700/291 |
| 2012/0179692 A1 | 7/2012 | Hsiao et al. |
| 2012/0215369 A1 | 8/2012 | Desai et al. |
| 2012/0216123 A1 | 8/2012 | Shklovskii et al. |
| 2012/0259678 A1 | 10/2012 | Overturf et al. |
| 2012/0290230 A1 | 11/2012 | Berges Gonzalez et al. |
| 2012/0310708 A1 | 12/2012 | Curtis et al. |
| 2013/0060531 A1 | 3/2013 | Burke et al. |
| 2013/0060720 A1 | 3/2013 | Burke |
| 2013/0097177 A1 | 4/2013 | Fan et al. |
| 2013/0097481 A1 | 4/2013 | Kotler et al. |
| 2013/0162037 A1* | 6/2013 | Kim ............ H02J 7/0068 307/24 |
| 2013/0173064 A1 | 7/2013 | Fadell et al. |
| 2013/0253709 A1 | 9/2013 | Renggli et al. |
| 2013/0261799 A1 | 10/2013 | Kuhlmann et al. |
| 2013/0262040 A1 | 10/2013 | Buckley |
| 2014/0006314 A1 | 1/2014 | Yu et al. |
| 2014/0019319 A1 | 1/2014 | Derby et al. |
| 2014/0074300 A1 | 3/2014 | Shilts et al. |
| 2014/0094980 A1 | 4/2014 | Saito et al. |
| 2014/0107850 A1 | 4/2014 | Curtis |
| 2014/0148706 A1 | 5/2014 | Van Treeck et al. |
| 2014/0163746 A1 | 6/2014 | Drew et al. |
| 2014/0207292 A1 | 7/2014 | Ramagem et al. |
| 2014/0337107 A1 | 11/2014 | Foster |
| 2015/0227522 A1 | 8/2015 | O'Donnell et al. |
| 2015/0227846 A1 | 8/2015 | Mercer et al. |
| 2015/0254246 A1 | 9/2015 | Sheth et al. |
| 2015/0267935 A1 | 9/2015 | Devenish et al. |
| 2015/0269664 A1 | 9/2015 | Davidson |
| 2015/0300831 A1 | 10/2015 | Sernicola |
| 2015/0310019 A1 | 10/2015 | Royer et al. |
| 2015/0310463 A1 | 10/2015 | Turfboer et al. |
| 2015/0310465 A1 | 10/2015 | Chan et al. |
| 2015/0319119 A1 | 11/2015 | Ryu et al. |
| 2015/0324819 A1 | 11/2015 | Lin et al. |
| 2015/0326679 A1 | 11/2015 | Lin et al. |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| JP | 2013-174412 A | 9/2013 |
| KR | 20130022039 A * | 3/2013 |
| KR | 101319254 B1 * | 10/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

Battery energy storage systems: Assessment for small-scale renewable energy integration Nirmal-Kumar C. Nair , Niraj Garimella (Year: 2010).*

International Search Report and Written Opinion for PCT Application No. PCT/US2015/038692, dated Sep. 24, 2015, 13 pages.

International Preliminary Report on Patentability for PCT Application No. PCT/US2010/055621, dated May 15, 2012, 8 pages.

International Search Report and Written Opinion for PCT Application No. PCT/US2010/055621, dated Dec. 23, 2010, 9 pages.

International Search Report and Written Opinion for PCT Application No. PCT/US2012/036539, dated Jul. 6, 2012, 8 pages.

International Preliminary Report on Patentability for PCT Application No. PCT/US2012/036539, dated Nov. 21, 2013, 7 pages.

International Search Report and Written Opinion for PCT Application No. PCT/US2013/046126, dated Aug. 22, 2013, 9 pages.

International Preliminary Report on Patentability for PCT Application No. PCT/US2013/046126, dated Jan. 8, 2015, 8 pages.

International Search Report for PCT Application No. PCT/US2014/036901, dated Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticon838>.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20060728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May, 19, 2008, 15 pages, available at http://web.archive.orgi/web/20080519220643/bie.berkeley.edu/coolcale/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

(56) References Cited

OTHER PUBLICATIONS

Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliverresidentialenergysavings>.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Freepik, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_ 42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not a Bill," posted at Not a Mystery, posting date 4/1812015, available at http://notamystery.com/2015/04/18/notworth the papeUts printed on/>.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopwer/>.

Laskey, Alex, et al., "OPOWER," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istatoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more .. ," http://www.nike.com/us/en us/c/nikeplus-f.,uelband, 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38welldesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.
EP Search Report a co-pending EP Appl. No. 16808227.9 (International Filing Date of Jun. 8, 2016) dated Sep. 21, 2018 (9 pgs.).

\* cited by examiner

DETERMINATION OF OPTIMAL ENERGY STORAGE METHODS AT ELECTRIC CUSTOMER SERVICE POINTS

BACKGROUND

Technical Field

Aspects of the disclosure relate to methods and systems for determining an optimal energy storage approach and in particular provide methods and systems for generating personalized recommendations regarding an optimal energy storage solution that can be deployed at a customer service point.

Introduction

Efficient operation of the power grid depends on proper balancing of power supply and demand. Many renewable intermittent energy sources, such as solar and wind power, pose unique challenges because peak power generation often does not correspond (in time) with peak demand. For example, solar panels tend to generate the largest amount of power during midday, but the highest electricity demands are often in the early evening.

SUMMARY

The following presents a simplified summary of one or more embodiments in order to provide a basic understanding of such embodiments. This summary is not an extensive overview of all contemplated embodiments, and is therefore not intended to identify key or critical elements of all embodiments nor delineate the scope of any or all aspects of the invention. Its sole purpose is to present some concepts of one or more embodiments in a simplified form as a prelude to a more detailed description, presented later.

Aspects of the technology relate to a data integrator including one or more processors and a memory coupled to the one or more processors, wherein the processors are configured to execute instructions including aggregating consumption data for a customer, wherein the consumption data comprises information regarding usage of a consumable resource by the customer, receiving energy production data for one or more energy production sources, and determining a utilization efficiency score for each of a plurality of energy storage devices based on the consumption data and the energy production data. In some aspects, the processors can be further configured for performing steps including ranking two or more of the energy storage devices based on the utilization efficiency.

In another aspect, the subject technology relates to a computer-implemented method including, receiving, via a communications network, consumption data for a customer, wherein the consumption data comprises information regarding usage of a consumable resource by the customer, and determining, using one or more processors, a utilization efficiency score for each of a plurality of energy storage devices based on the consumption data. In certain aspects, the method may include steps for ranking two or more of the energy storage devices based on the utilization efficiency.

In yet another aspect, the subject technology can relate to a non-transitory computer-readable storage medium that includes instructions stored therein, which when executed by one or more processors, causes the processors to perform operations including, receiving, via a communication network, consumption data for a customer, wherein the consumption data comprises information regarding usage of a consumable resource by the customer and determining a utilization efficiency score for each of a plurality of energy storage devices based on the consumption data. In some aspects, the processors may be further configured for ranking two or more of the energy storage devices based on the utilization efficiency.

BRIEF DESCRIPTION OF THE DRAWINGS

In the following description, reference is made to figures that show, by way of illustration, specific examples in which the subject technology can be practiced. It is understood that other aspects may be utilized and changes made without departing from the scope of the subject technology. In the figures.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Problem and Solution

In some aspects, energy storage solutions can be used to address the temporal misalignment of power generation and consumption i.e., by storing energy produced at off-peak demand times for later use. Energy storage may be advantageously applied whenever energy supply exceeds demand. Conversely, when energy production falls below demand, stored energy can be discharged from a stored energy source, for example, to avoid drawing power from an electric grid.

In some approaches, stand-alone batteries, flywheels, and pumped hydroelectric facilities can be used for storage of surplus energy. In the latter case, water is pumped to a high elevation (using excess electricity) and stored for later release to produce power at times when electricity is needed. Recent technical advancements, however, have led to an increase in the number of available energy storage modes at customer consumption sites, as well as improvements in storage efficiency. As the number of available energy storage options continues to increase, customers are forced to decide between competing storage solutions, each of which may have different pros and cons, for example due to variations in cost, ease of installation, and energy efficiency, etc.

Aspects of the subject technology address the foregoing problem by providing systems and methods for determining an optimal energy storage solution for a customer service point based on an analysis of customer behavior (including energy consumption and production), customer characteristics (e.g., economic indicators, building type, etc.), and additional local data inputs (e.g., weather patterns, energy prices, net metering regime, technology costs, etc.).

Determination of Optimal Storage Method

In some aspects, the subject technology provides a data aggregator configured to collect energy consumption data and energy production data for a customer and determine a ranking of optimal (or available) energy storage solutions, e.g., based on the customer's resource usage behavior and/or cost/efficiency considerations for various storage media types. Aspects of the subject technology are described with examples provided for various energy storage solutions (e.g., batteries, building heating/cooling, water heating, ice production, etc.), however, it is understood that other energy storage media may be implemented, without departing from the scope of the technology.

Additionally, comparisons of various storage solutions or energy storage media can be performed using different types of data, such as user consumption data (e.g., for one or more consumable resources), user energy production data (e.g., from rooftop solar panels), demographic data, weather information, and/or economic or cost considerations. However, it is understood that the use of additional (or fewer) data types may be used to implement a data aggregator of the subject technology, without departing from the scope of the invention.

As discussed in further detail below, the data aggregator can be configured to use all available information to calculate a utilization efficiency score for each of a number of energy storage media/devices. As used herein, a utilization efficiency score can represent a quantification of cost/benefit tradeoffs for a particular energy storage type. Thus, the utilization efficiency score may be used to compare two different energy storage methods or devices, such as hot water storage and batteries. As also discussed below, the utilization efficiency score can also be based on other types of information, such as customer location, customer usage patterns, weather data, and/or cost information relating to various energy storage media or methods.

After the utilization efficiency score is calculated for multiple different storage types, a targeted recommendation can be provided to inform the customer of a preferred or optimal storage solution. In some aspects, the utilization efficiency score is personalized based on a particular set of data associated with a particular customer and used to provide the customer with one or more personalized recommendations for storage solutions.

Figure 1:
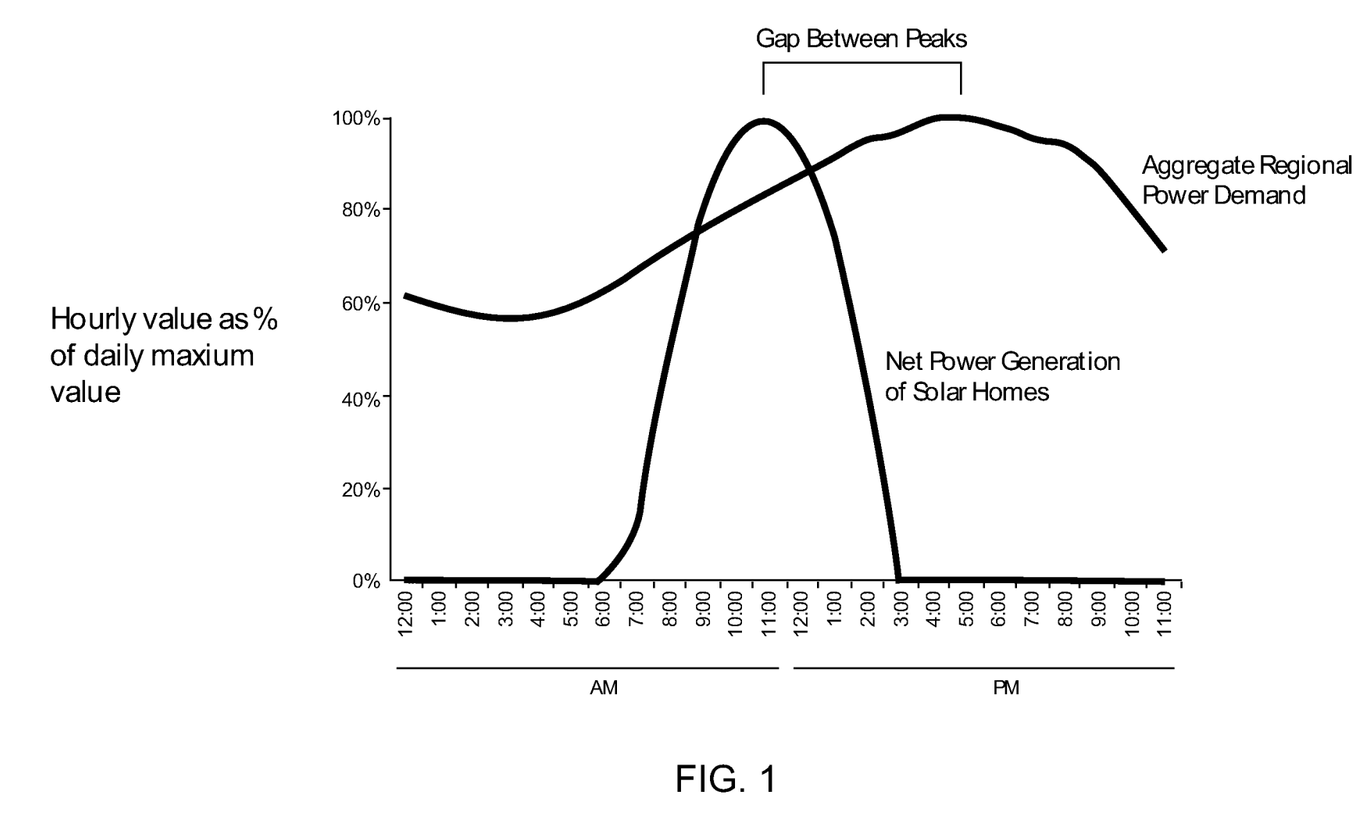
FIG. 1 illustrates an example of energy production and demand curves, in accordance with some intermittent power supply implementations.

FIG. 1 illustrates an example of energy production and demand curves, in accordance with some intermittent power supply implementations. Intermittent power sources (such as solar panels or wind turbines) often provide their greatest power output at times differing from those of peak demand. Referring to the example of FIG. 1, the peak power demand (e.g., aggregate regional power demand) occurs around 5:00 PM. In contrast, greatest energy production (e.g., net power generation from solar panels) occurs between 10:00 AM and 12:00 PM. The "gap between peaks" illustrates a temporal difference between production and demand, indicating an amount of power loss that would occur without the benefit of an energy storage solution (or absorption into a broader electric grid).

As discussed above, several types of energy storage devices or methods can be used to capture power that is generated (e.g., by an energy production service or device), in excess of an instantaneous demand. As used herein, an energy production source or service can refer to one or more devices or systems that are configured to produce energy, such as electric power. In some instances an energy production source can encompass hardware and/or software necessary to produce and direct power, for example, to a storage device such as a battery. By way of example, energy production sources can include, but are not limited to: solar arrays, wind turbine generators, tidal and/or wave power generation systems, and/or hydroelectric turbines, etc. As discussed in conjunction with examples illustrated below, energy production sources may be either on-site (e.g., proximately located near a resource consumption site, such as a business or residence), or remote, e.g., remotely coupled to a consumption site via power transmission infrastructure, such as an electric grid.

Additionally, as used herein, energy storage solutions, devices, and methods can refer to hardware devices (and software) necessary to implement energy storage methods. As such, energy storage solutions can encompass storage media such as batteries (e.g., lithium ion batteries). However, other energy storage techniques are contemplated by this disclosure, and can include, for example, the heating of water (e.g., in a hot water heater), or cooling of water, for example, to produce ice.

In addition to cost and efficiency considerations of a particular energy storage solution, the usage type is also critical in determining whether a given energy storage method is maximally effective. As used herein, a usage type or "usage type information" can refer to an end-use (e.g., by a customer) for which the stored/produced energy is used. By way of example, if a customer's frequent end-use is to heat water, it may be more efficient to utilize excess power generation to pre-heat water directly (e.g., in a home water heater), than it would be to store the excess power to a battery, and then use the battery charge to heat the water.

By way of further example, if a user's primary desired end-use is to power electronic devices or electrical appliances, it may be impractical to store excess power (e.g., electrical charge produced by a solar array), using an ice generation technique. As such, in addition to cost and energy efficiency/conversion considerations, usage type information can be critical to determining the most effective device/method for storing excess power. In combination, these constraints can make it difficult for a user to compare energy storage solutions, and to determine a most effective storage means, e.g., based on his/her own behavior, use patterns, and cost sensitivities.

Aspects of the subject technology relate to a data aggregator configured to receive/aggregate a multitude of data and signals that can be used to identify an optimal energy storage solution for a particular user. In the following disclosure, various data/signal types are discussed in conjunction with a data aggregator; however, it is understood that the use of information and data is not limited to these examples. Any type of data may potentially be used (e.g., by a data aggregator), to make comparisons between two or more energy storage methods or solutions.

As discussed herein, particular types of information that can be highly relevant for the comparison of various energy storage methods or media can include but are not limited to: consumption data (e.g., for a customer/user), cost data (e.g., the cost of acquiring, operating and/or maintaining an energy storage device), production data (e.g., energy production for an energy generating device, method or system), location data (e.g., identifying a geographic location or region of a user/customer or consumption site), customer demographic data (e.g., economic indicators and household size), behavioral data (e.g., customer use of utility company web portals; adoption of electronic energy billing; customer ownership of an electric vehicle as suggested by consumption data patterns or enrollment in a specialized utility rate plan for EV owners; other participation in energy optimization programs managed by a utility or third party), building constraints (e.g., physical properties of structure at a consumption site such as a residential or commercial building), building characteristics (e.g., zoning distinctions, age, etc.), and resource provider information (e.g., indicating preferences or selections preferred by a resource provider, such an electrical utility provider), etc.

Figure 2:
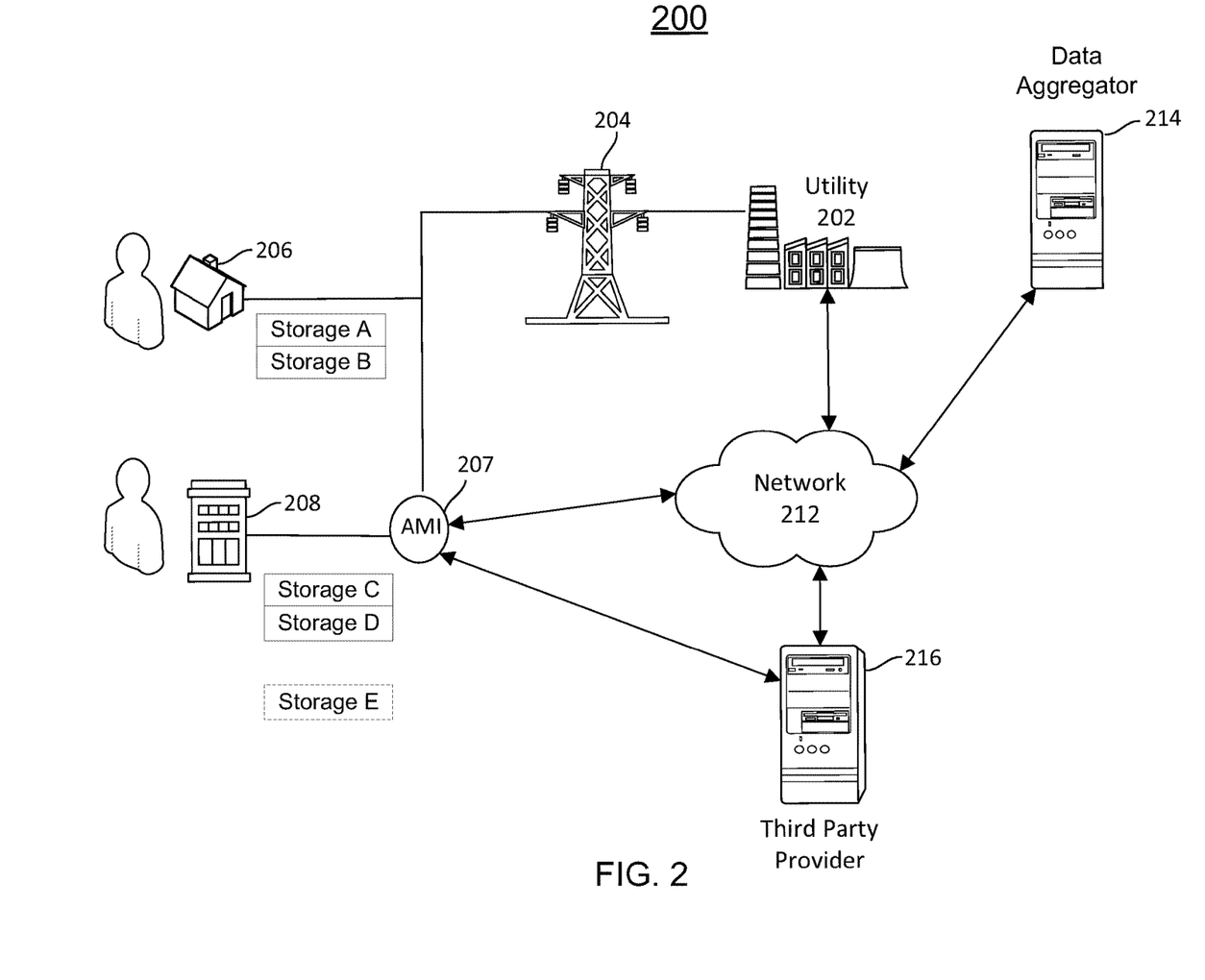
FIG. 2 illustrates an example environment that can be used to implement a data aggregator, according to some aspects of the subject technology.

FIG. 2 illustrates an example environment 200 that can be used to implement a data aggregator (e.g. data aggregator 214), according to some aspects of the invention. Environment 200 includes a utility 202 (e.g., a power utility), power infrastructure 204 (e.g., a power grid) including an advanced metering infrastructure (AMI) device 207, data aggregator 214, and a third-party provider 216. As illustrated, utility 202, AMI 207, data aggregator 214, and data aggregator 214 are communicatively coupled by a communication network (e.g., network 212). Additionally, power consumption sites 206 and 208 are connected to power infrastructure 204, each of which are associated with a set of energy storage devices i.e., Storage A/Storage B, and Storage C/Storage D, respectively.

It is understood that environment 200 provides example devices and a communication topology that could be used to implement certain aspects of the subject technology, however other configurations can be used without departing from the scope of the invention. For example, environment 200 can include a greater (or fewer) number of customers/users (e.g., corresponding with consumption sites 206, and 208), and/or a greater/fewer number of utility resource providers (such as utility 202).

Although in the illustrated example of environment 200, utility 202 represents a power utility, it is understood that utility 202 can represent a provider of other resource types, such as water and/or gas. In turn, data aggregation system 214 and third party provider 216 are respectively depicted as separate and discrete processing systems, however each may be implemented using distributed hardware and/or software implementations, for example, employing data centers or a distributed computing architecture. Additionally, a greater or fewer number of energy storage devices may be implemented at each consumption site. Each storage device can represent a different storage medium (e.g., lithium ion batteries), or a device and method pairing (e.g., a water heater and control system).

Environment 200 may also include other power generation systems (e.g., power production sources) in addition to utility 202, which may be coupled to power infrastructure 204, or associated with one or more consumption site 206 and/or 208. For example, a business associated with consumption site may be provided power locally using a wind turbine (not shown), whereas residential consumption site 206 may be powered, at least in part, by a solar array.

In operation, data aggregator 214 collects various types of information and signals pertaining to energy use and power generation at each of power consumption sites 206 and 206. Such information can be received by data aggregator 214, e.g., from utility 202, third party provider 216, or directly from a consumption site, such as power consumption site 208, e.g., using AMI device 207.

Examples of types of data that can be collected by data aggregator 214 include (1) consumption data that can include power consumption information for consumption sites 206/208; and (2) energy production data that can provide indications as to an amount of energy produced for (or at) a particular consumption site and/or an amount of power that is being produced in excess of the instantaneous power demand.

Depending on implementation, consumption information may include indications of an amount of power used/consumed over a given time interval, such as on a month-to-month, week-by-week, or day-by-day basis. In some aspects, wherein advanced metering devices are implemented (e.g., AMI 207) power consumption may be measured on a smaller time scale, such as on an hourly or minute-by-minute basis. Power production data can also be measured over various time intervals, such as on an hourly basis as discussed above with respect to FIG. 1.

Customer information, including behavior information and demographic information can be collected (and provided) by a variety of sources. As illustrated with respect to environment 100, customer information can be collected by a resource provider (e.g., utility provider) 102 or a third-party information/service provider (e.g., third-party provider 116). In some aspects, customer information can be provided directly to data aggregator 214, for example, using an advanced metering infrastructure (AMI) device, such as AMI 107.

In addition to consumption data and energy production data, other types of data collected about consumption sites 206, 206 (or associated customers) can include, but are not limited to: location data, weather data, storage media cost data, building constraint/characteristic data, and/or resource provider information. For example, location information and weather data for consumption site 206 may be provided to data aggregator 214 by a third-party provider (e.g., a weather and/or map service), whereas consumption data can be provided by utility 202, and energy production data may be provided directly by an energy generation source, such as a solar panel (not illustrated). Cost information pertaining to one or more energy storage medium or method can also be calculated or received by data aggregator 214, e.g., from a third-party resource, such as a cost database hosted by third party provider 216.

In yet another example, consumption data for consumption site 208 may be provided directly to data aggregator 214 using AMI 207, e.g., via network 212. In both instances, data aggregator can receive and collect information pertaining to energy use, energy production, weather conditions, and locations for each consumption site 206, 208. In some implementations, data aggregator 214 may also collect information about available storage devices at a customer's home or business, such as, Storage A/B for consumption site 206, and Storage C/D for consumption site 208.

Once available relevant information has been collected, data aggregator can use the information (e.g., consumption data and energy production data) to calculate a utilization efficiency score for a variety of different energy storage methods and/or media. The utilization efficiency score can be used to quantify cost/efficiency tradeoffs for an individual customer location, with respect to a variety of different energy storage solutions. Thus, the computed utilization efficiency score can be used to provide individualized power storage recommendations for a particular customer, based on the customer's usage history, cost considerations, as well as other factors such as weather, consumption location and building characteristics.

In some aspects, a computed utilization efficiency score may be used to provide recommendations to a customer regarding options for storage media methods that he/she may employ. Alternatively, the computed efficiency score may be used to choose between energy storage solutions that are already exist at the consumption site.

By way of example, data can be collected by data aggregator 214 for a customer associated with consumption site 208. Such information can include consumption data provided by AMI 207, for example, in the form of a historic representation of power consumption over time (e.g., a load curve). Weather, storage media cost data and/or location information can also be provided by one or more third-party services, such as that represented by third-party provider 216. Once all necessary information is collected by data aggregator 214, a utilization efficiency score is calculated for all available or relevant storage media (e.g., Storage C/D) and/or storage media that may or may not be installed at the consumption site (e.g., Storage E).

In some aspects, data aggregator 214 can be used to provide notifications to a customer associated with the consumption site. Further to the above example, a customer associated with consumption site 208 may be provided with a ranking of optimal energy storage method or solutions. Alternatively, notifications provided to the customer may include recommendations and cost comparisons for recommended energy storage devices, such as batteries or advanced water heating devices.

In some instances, notifications may be determined based on customer demographic data that is provided to data aggregator 214. For example, cost considerations for one or more storage medium type may be used to match storage solutions with users based on an amount of investment cost that the user is likely to be able (or willing) to absorb. That is, customer demographic information (such as salary data, location, building size, etc.), may be used to determine not only what energy storage solutions would be most efficient, but also what solution/s would be economically viable for the notification recipient.

In another example, consumption data may be collected by aggregator 214 for a residential consumption site, such as consumption site 206. Energy production data for a power generation device (e.g., a solar array) can also be collected to indicate when (and how much) power is generated at consumption site 206. Using the foregoing collected information, as well as cost parameters, for example, received from third party provider 216, data aggregator 214 can calculate a utilization efficiency score for each of a number of available energy storage options. Alternatively, the utilization efficiency score may be used to provide user recommendations for choosing or alternating use as between two or more existing storage devices, such as Storage A and Storage B.

Although the example of environment 200 illustrates the remote use of data aggregator 214 over network 212, it is understood that data aggregator 214 could be provided as a localized system configured to serve one or more consumption locations. For example, data aggregator 214 could be installed at a residential consumption site (e.g., consumption site 206) and configured to provide recommendations, and rankings etc., to a customer associated with that location. An example of a data aggregator implemented using a localized architecture is discussed in further detail with respect to FIG. 3, below.

Figure 3:
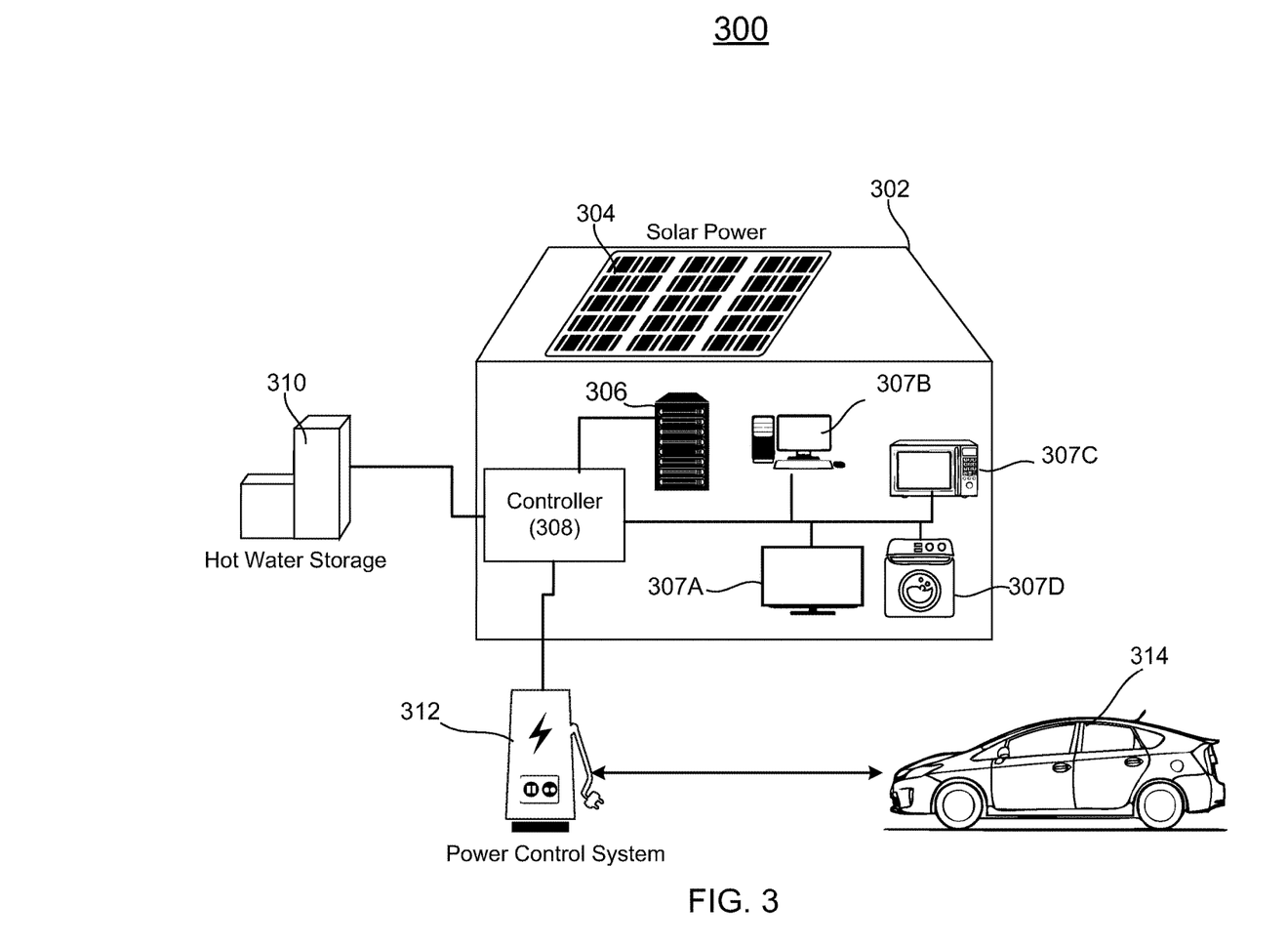
FIG. 3 conceptually illustrates an example residential environment in which a data aggregator can be used for analyzing various energy production and consumption metrics.

FIG. 3 conceptually illustrates an example consumption site (e.g., residential environment 300) in which a data aggregator 306 is used to analyze various energy production and consumption metrics, for example, to provide recommendations regarding how one or more energy storage options should be utilized. Environment 300 includes a residential consumption site 302 (i.e., a residential building) that includes power generation source 304 (e.g., a solar array), data aggregator 306, and controller 308 for selecting between storage devices (e.g., hot water storage 310, power control system 312 and/or electric vehicle 314).

As illustrated, data aggregator 306, electrical devices 307A-307D, power generation source 304, and storage devices 310 and 314, are all coupled to controller 308. Controller 308 can be configured to provide communications and power switching necessary to direct current from generation source 304 and/or storage sources 310, 312, 314 to power one or more electrical devices or appliances, such as devices 307A-307D.

Various types of information can be collected by data aggregator 306 regarding consumption site 302. Some signals and information collected by data aggregator 306 can include power production information (e.g., for generation source 304), power consumption information (e.g., amounts and times of energy usage), power usage types, and/or information regarding the availability of energy storage media or methods at consumption site 302. In some aspects, characteristic/constraint information for consumption site 302 may also be collected by data aggregator 306, for example, via a communication network (not shown).

By way of example, energy production may exceed energy use during midday when the solar array is at its peak production and a customer associated with consumption site 302 is typically away from home (e.g., on weekdays). Based on usage type information collected by data aggregator 306, it may be determined that a primary power use for an associated customer is in the form of electrical current needed to power various electrical appliances and electronic devices. Based on these considerations, a higher utilization efficiency score may be calculated for a battery storage device, such as storage 312, as compared to a hot water storage device (e.g., storage device 310). Accordingly, data aggregator may be used to generate a message to the customer to let him/her know that battery storage is preferable to hot water storage, for example, based on his/her typical weekday use.

In yet another example, a customer associated with consumption site 302 may prefer to drive his/her electric vehicle frequently during nighttime hours. Accordingly, based on the customer's energy utilization type (e.g., power for an electric vehicle), energy storage in an electric vehicle may be determined to have a better (higher) utilization efficiency score as compared to either a stand-alone battery (e.g., second storage 312) or a hot water storage system (e.g., first storage 310).

In some aspects, building constraints or characteristic information may be used to weight a utilization efficiency score for a particular storage medium type. For example, in instances where a consumption site has a relatively small square footage (e.g., a small business or residential location), ice generation/storage systems may be more lowly weighted, i.e., given a lower utilization efficiency score, due to space constraints at the customer location.

In another aspect, in instances where building characteristic information indicates that a particular consumption location is without a heating-ventilating and air-conditioning (HVAC) system, then thermostat driven storage methods (such as pre-heating or pre-cooling) may be less heavily weighted (or not recommended at all). Alternatively, if building constraint/characteristic data indicates that a building is outfitted with a non-electric water heater (e.g., a solar thermal water heater), then storage media that store excess electrical energy as heated water may be determined to have a lower utilization efficiency score and would therefore be less likely to be recommended over other energy storage approaches.

In yet another example, in instances where a property is determined to lack automobile parking (e.g., a garage space or parking lot), storage methods that include energy storage onto an electric vehicle battery may be less heavily weighted as compared, for example, to local battery storage or water heating.

Figure 4:
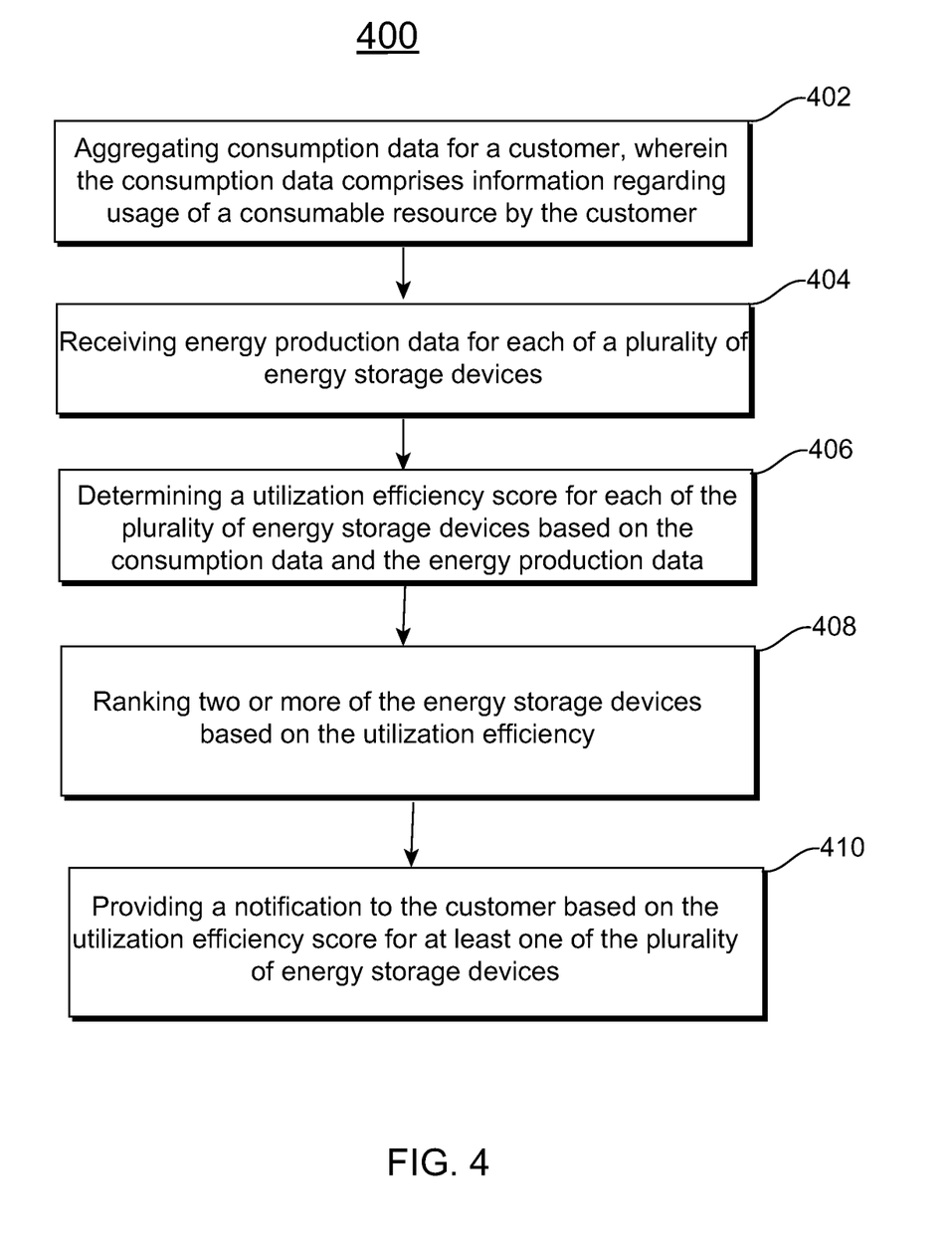
FIG. 4 illustrates steps of an example method that can be implemented using a data aggregator, according to some aspects.

FIG. 4 illustrates steps of an example method 400 that can be implemented using a data aggregator, similar to that discussed above with respect to FIGS. 1-3. Method 400 begins with step 402 in which customer consumption data is aggregated, e.g., by a data aggregation system. Aggregation of customer consumption data can be performed in different ways, depending on the desired implementation. In some approaches, consumption data may be received by the aggregations system from a remote source, such as a utility provider or a third-party data provider. In other approaches, the aggregation of customer consumption data may be performed through direct interaction between the data aggregation system and a smart metering device e.g., an AMI device, or the like.

As discussed above, customer consumption data can include any type of data describing or quantifying the use of a consumable resource. By way of example, consumption data can include amounts of power usage consumed over a time period, represented as load curve data. Additionally, consumption data may include information describing statistics or trends in resource consumption, such as indications of when peak usage typically occurs. Although the forgoing examples are discussed with respect to the consumption of electric power, it is understood that other consumable resources are contemplated by this disclosure. For example, consumable resources may include water and/or natural gas, etc.

In step 404, energy production data is received by from one or more energy production devices or services. Energy production data can include any type of information relating to energy production for one or more energy generation sources. Energy generation sources can include any device/s or method/s that generate a power resource and may include, but are not limited to: solar arrays, wind turbine generators, marine energy such as tidal and wave power (at coastal locations), other hydroelectric turbines, etc.

Once consumption data and energy production data are collected by the data aggregation system, method 400 proceeds to step 406, in which a utilization efficiency score is determined for each of a plurality of energy storage devices or solutions. It is understood that while consumption and energy production data can be used in the utilization efficiency score calculation, a variety of other signals and/or data sources may be employed. By way of example, information about user location, utility provider preferences, customer preferences, weather and/or cost data for a variety of energy storage solutions may be collected and used to perform utilization efficiency score calculations.

A computed utilization efficiency score provides a quantifiable scoring to indicate a degree of appropriateness of a particular energy storage solution for a particular customer. In this manner, different energy storage solutions and methods may be directly compared, for example, to help provide recommendations to one or more users or customers.

In step 408, two or more energy storage devices are ranked based on the utilization efficiency score. In some aspects, a storage solution with a utilization efficiency score below a predetermined threshold may not be considered for ranking. By way of example, if utilization scores are calculated for a battery (8), a water heater (6), and an ice generation method (2), the battery and water heater may be determined to be the first and second best solutions (i.e., with utilization scores of 8 and 6, respectively). However, if there is a ranking threshold of 7, only the battery may be returned in the ranking.

Subsequently, in step 410, a notification is provided to the customer based on the utilization efficiency score for at least one of the energy storage devices. Further to the example discussed above with respect to step 405, the ranking (including only the battery), may be provided to the user as a recommended energy storage option for his/her specific type of use.

Figure 5:
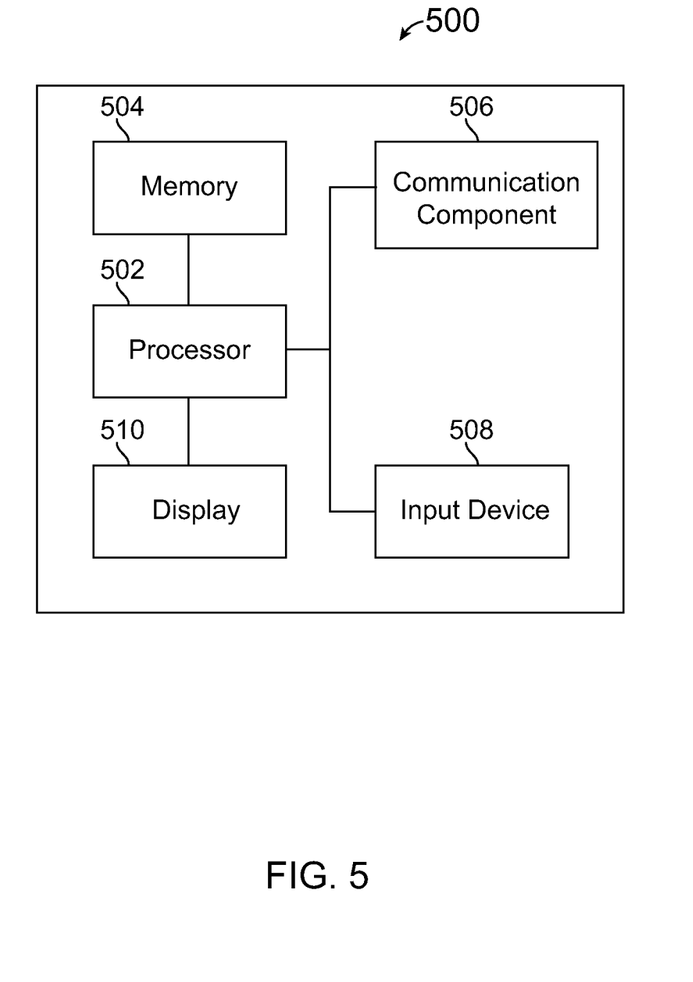
FIG. 5 illustrates a conceptual block diagram of hardware components that can be used to implement a data aggregation system, according to some aspects of the technology.

FIG. 5 illustrates a conceptual block diagram of hardware components that can be used to implement a data aggregation system, according to some aspects of the technology.

As would be apparent to one of skill in the art, computing device 505 can include various types of memory, data storage, and/or non-transitory computer-readable storage media, such as a first data storage for program instructions for execution by the processor 502, a separate storage for usage history or user information, a removable memory for sharing information with other devices, etc. Computing device 505 can also include one or more communication components 506, such as a Wi-Fi, Bluetooth®, radio frequency, near-field communication, wired, and/or wireless communication systems, etc.

Computing device 505 can communicate with a network (e.g., network 503), such as the Internet, and can be configured to communicate with other such devices, such as one or more smart thermostat device, demand response devices, and/or AMI metering devices. Computing device 505 may also include at least one input device 508 configured to receive input from a user. Such inputs may include, for example, one or more push button/s, touch pad/s, touch screen/s, wheel/s, joystick/s, keyboard/s, a mouse, keypad/s, or other such devices or elements enabling a user to input a command to the device. In some aspects, however, such a device may not include any buttons at all, but rather controlled through a combination of visual and audio commands, such that a user can manipulate data input to the device without direct physical contact. Computing device 505 can also include a display element 510, such as a touch-screen or liquid crystal display (LCD).

The various aspects can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In aspects utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory devices. These can reside in a variety of locations, such as on a computer data storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A data integrator comprising:
   a memory for storing computer-executable instructions;
   a processor configured to execute the instructions from the memory, wherein the instructions when executed by the processor cause the processor to:
   aggregate consumption data for a consumption location associated with a customer, wherein the consumption data comprises information regarding usage of a consumable resource by the consumption location;
   receive energy production data for one or more energy production sources associated with the consumption location;
   determine a utilization efficiency score for each type of a plurality of types of energy storage device based on the consumption data and the energy production data, wherein the utilization efficiency score for each type of energy storage device quantifies tradeoffs between cost and efficiency of that type for the consumption location, wherein the plurality of types of energy storage device include more than one of battery, water heating, water chilling or freezing, building heating, and building cooling devices; and rank two or more of the plurality of types of energy storage device in order of the quantification based on the utilization efficiency to indicate a recommended type of energy storage device for installation at the consumption location.

2. The data integrator of claim 1, wherein the processors are further configured to execute instructions comprising:
providing a notification to the customer based on the utilization efficiency score for at least one of plurality of energy storage devices, wherein the notification comprises an energy storage recommendation based on the ranking of the two or more of the types of energy storage device.

3. The data integrator of claim 1, wherein the processors are further configured to execute instructions comprising:
receiving location data for the consumption location, wherein the location data comprises information identifying a geographic region or geographic location associated with the consumption location; and
receiving weather data associated with the geographic region or geographic location, and wherein the utilization efficiency score is further based the location data and the weather data.

4. The data integrator of claim 3, wherein the location data further comprises information regarding physical building constraints or building characteristics for the consumption location.

5. The data integrator of claim 1, wherein the consumption data further comprises end-use information indicating one or more ways in which the consumable resource is utilized by the consumption location.

6. The data integrator of claim 1, further comprising:
receiving resource provider information from a provider of the consumable resource, wherein the resource provider information indicates a preferred energy storage medium from among the plurality of types of energy storage device, and
wherein determining the utilization efficiency score is further based on the resource provider information.

7. A computer-implemented method comprising:
receiving, by a communications network, consumption data for a consumption location associated with a customer, wherein the consumption data comprises information regarding usage of a consumable resource by the consumption location;
receiving, by the communications network, energy production data for one or more energy production sources associated with the consumption location;
determining, by a processor, a utilization efficiency score for each of a plurality of types of energy storage device based on the consumption data, wherein the utilization efficiency score for each type of energy storage device quantifies tradeoffs between cost and efficiency of that type for the consumption location, wherein the plurality of types of energy storage device include more than one of battery, water heating, water chilling or freezing, building heating, and building cooling devices;
ranking, by the processor, two or more of the plurality of types of energy storage device in order of the quantification based on the utilization efficiency; and
controlling, by the processor, a display to show a recommended type of energy storage device for installation at the consumption location, wherein the recommendation is based at least in part on the ranking.

8. The computer-implemented method of claim 7, further comprising:
receiving, by the communications network, energy production data for one or more energy production sources.

9. The computer-implemented method of claim 7, further comprising:
providing, by the processor, a notification to the customer based on the utilization efficiency score for at least one of plurality of energy storage devices, and
wherein the notification comprises an energy storage recommendation based on the ranking of the two or more of the energy storage devices.

10. The computer-implemented method of claim 7, further comprising:
receiving, by the communications network, location data for the consumption location, wherein the location data comprises information identifying a geographic region or geographic location associated with the consumption location; and
receiving, via the communications network, weather data associated with the geographic region or geographic location, and wherein the utilization efficiency score is further based the location data and the weather data.

11. The computer-implemented method of claim 10, wherein the location data further comprises information regarding physical building constraints or building characteristics for the consumption location.

12. The computer-implemented method of claim 7, wherein the consumption data further comprises end-use information indicating one or more ways in which the consumable resource is utilized by the consumption location.

13. The computer-implemented method of claim 7, further comprising:
receiving, by the communication network, resource provider information from a provider of the consumable resource, wherein the resource provider information indicates a preferred energy storage medium from among the plurality of types of energy storage device, and
wherein determining the utilization efficiency score is further based on the resource provider information.

14. The computer-implemented method of claim 7, further comprising determining an amount of investment cost that the customer is likely to be willing to absorb based on demographic information received over the communications network and associated with the customer, wherein the recommendation is further based at least in part on the investment cost amount.

15. A non-transitory computer-readable storage device comprising instructions stored therein, which when executed by one or more processors, cause the processors to perform operations comprising:
receiving, through a communication network, consumption data for a consumption location associated with a customer, wherein the consumption data comprises information regarding usage of a consumable resource by the consumption location;
receiving, through the communications network, energy production data for one or more energy production sources associated with the consumption location;
determining a utilization efficiency score for each of a plurality of types of energy storage device based on the consumption data, wherein the utilization efficiency score for each type of energy storage device quantifies tradeoffs between cost and efficiency of that type for the consumption location, wherein the plurality of types of energy storage device include more than one of battery, water heating, water chilling or freezing, building heating, and building cooling devices; and controlling a display to show a ranking of two or more of the energy storage device types in order of the quantification based on the utilization efficiency to indicate a recommended type of energy storage device for installation at the consumption location.

16. The non-transitory computer-readable storage medium of claim 15, wherein the processors are further configured to perform operations comprising:

determining energy production amounts for each of a plurality of energy production sources.

17. The non-transitory computer-readable storage medium of claim 15, further comprising:

receiving, via the communication network, location data for the consumption location, wherein the location data comprises information identifying a geographic region or geographic location associated with the consumption location; and receiving, via the communications network, weather data associated with the geographic region or geographic location, and wherein the utilization efficiency score is further based the location data and the weather data.

18. The non-transitory computer-readable storage medium of claim 17, wherein the location data further comprises information regarding physical building constraints for the consumption location.

19. The non-transitory computer-readable storage medium of claim 17, wherein the location data further comprises information regarding building characteristics for the consumption location.

20. The non-transitory computer-readable storage medium of claim 15, wherein the consumption data further comprises end-use information indicating one or more ways in which the consumable resource is utilized by the consumption location.

* * * * *